(12) United States Patent
Shiohara (10) Patent No.: US 10,187,576 B2
(45) Date of Patent: Jan. 22, 2019

(54) IMAGE-DISPLAYING DEVICE AND IMAGE DATA GENERATION DEVICE

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/843,155

(22) Filed: Sep. 2, 2015

(65) Prior Publication Data

US 2015/0381897 A1 Dec. 31, 2015

Related U.S. Application Data

(63) Continuation of application No. 13/109,436, filed on May 17, 2011, now Pat. No. 9,159,297.

(30) Foreign Application Priority Data

May 18, 2010 (JP) .................................. 2010-113978
Sep. 27, 2010 (JP) .................................. 2010-214841

(51) Int. Cl.
*G09G 5/12* (2006.01)
*G09G 5/18* (2006.01)
(Continued)

(52) U.S. Cl.
CPC ............ *H04N 5/23293* (2013.01); *G09G 5/12* (2013.01); *G09G 5/18* (2013.01); *G09G 5/393* (2013.01);
(Continued)

(58) Field of Classification Search
None
See application file for complete search history.

(56) References Cited

U.S. PATENT DOCUMENTS

| 5,617,113 A | 4/1997 | Prince |
| 5,629,744 A | 5/1997 | Kawamura |

(Continued)

FOREIGN PATENT DOCUMENTS

| EP | 0678847 A1 | 10/1995 |
| JP | 05-191817 A | 7/1993 |

(Continued)

OTHER PUBLICATIONS

The Extended European Search Report for European Patent Application No. 11166419.9 dated Dec. 23, 2011.

(Continued)

*Primary Examiner* — Ifedayo B Iluyomade (57) ABSTRACT

An image-displaying device includes an image data generation section, a progress information acquisition section and a display control section. The image data generation section is configured to perform processing for generating image data indicative of an image of a subject based on output data from an image-capturing section that captures the image of the subject, the image data being composed of a plurality of predetermined data units. The progress information acquisition section is configured to acquire progress information indicative of a status of progress of the processing for generating the image data with respect to each of the predetermined data units of the image data. The display control section is configured to control the display section to display at least one of the predetermined data units of the image data for which the processing for generating the image data is ended based on the progress information.

6 Claims, 6 Drawing Sheets

(51) Int. Cl.
*G09G 5/393* (2006.01)
*G09G 5/395* (2006.01)
*H04N 5/232* (2006.01)
*H04N 101/00* (2006.01)

(52) U.S. Cl.
CPC ......... *G09G 5/395* (2013.01); *G09G 2310/08* (2013.01); *G09G 2340/0407* (2013.01); *G09G 2360/121* (2013.01); *H04N 2101/00* (2013.01)

(56) References Cited

U.S. PATENT DOCUMENTS

| | | | |
|---|---|---|---|
| 6,133,900 | A | 10/2000 | Esaki |
| 7,710,468 | B2 | 5/2010 | Uchida et al. |
| 7,868,890 | B2 | 1/2011 | Ludwin et al. |
| 8,937,673 | B2 | 1/2015 | Shiohara et al. |
| 9,159,297 | B2 * | 10/2015 | Shiohara .................. G09G 5/12 |
| 2004/0257321 | A1 * | 12/2004 | Baek ........................ G09G 5/18 345/87 |
| 2005/0052542 | A1 | 3/2005 | Iwai et al. |
| 2005/0184993 | A1 | 8/2005 | Ludwin et al. |
| 2007/0097104 | A1 * | 5/2007 | Kuroki ..................... G09G 3/34 345/204 |
| 2007/0211153 | A1 | 9/2007 | Uchida et al. |
| 2008/0151070 | A1 * | 6/2008 | Shiozawa .......... H04N 5/23293 348/222.1 |
| 2009/0047010 | A1 | 2/2009 | Yoshida et al. |
| 2010/0231742 | A1 | 9/2010 | Yanada et al. |

FOREIGN PATENT DOCUMENTS

| | | |
|---|---|---|
| JP | 07-294883 A | 11/1995 |
| JP | 2001-113039 A | 4/2001 |
| JP | 2004-165827 A | 6/2004 |
| JP | 2004-325821 A | 11/2004 |
| JP | 2005-073077 A | 3/2005 |
| JP | 2005-275357 A | 10/2005 |
| JP | 2007-243615 A | 9/2007 |
| JP | 2007-295096 A | 11/2007 |

OTHER PUBLICATIONS

The Extended European Search Report for European Patent Application No. 11166422.3 dated Jun. 14, 2012.

\* cited by examiner

IMAGE-DISPLAYING DEVICE AND IMAGE DATA GENERATION DEVICE

CROSS-REFERENCE TO RELATED APPLICATIONS

This application is a continuation application of U.S. patent application Ser. No. 13/109,436 filed on May 17, 2011. This application claims priority to Japanese Patent Application No. 2010-113978 filed on May 18, 2010 and Japanese Patent Application No. 2010-214841 filed on Sep. 27, 2010. The entire disclosures of U.S. patent application Ser. No. 13/109,436 and Japanese Patent Application Nos. 2010-113978 and 2010-214841 are hereby incorporated herein by reference.

BACKGROUND

Technical Field

The present invention relates to an image-displaying device for displaying an image of a subject in a display section, and to a display timing control circuit.

Related Art

Conventional image-capturing devices are known in which an image captured by an image-capturing sensor is displayed by a liquid crystal display, and various techniques have been developed for preventing a delayed display of the image of the subject from occurring in the liquid crystal display. In Japanese Laid-Open Patent Application Publication No. 2007-243615, for example, a technique is disclosed whereby an image signal is read and displayed by a liquid crystal display before writing of the image signal of a single frame to the VRAM is completed in an image-capturing device provided with a VRAM for recording an image signal of a single frame. Specifically, a configuration is described in which image display by a liquid crystal display is started at a playback timing that is delayed by ΔT from the drive timing of the image-capturing sensor.

SUMMARY

In the technique of Japanese Laid-Open Patent Application Publication No. 2007-243615, the cycle of the drive timing and the playback timing is the cycle for processing an image of a single frame, and a constant ΔT is defined for each frame. In other words, in the technique of this publication, ΔT is described as being defined for each mode (Japanese Laid-Open Patent Application Publication No. 2007-243615, paragraph [0057]), and ΔT is determined so that reading of image data does not take place before writing thereof (Japanese Laid-Open Patent Application Publication No. 2007-243615, paragraphs [0055] and [0056]). Consequently, although ΔT may fluctuate for each mode, ΔT is a common value for each frame in the same mode, and the same phase difference ΔT is given for all lines of the image that is to be displayed.

However, in a configuration in which image processing for displaying the image of a subject in a display section is performed based on output data of an image-capturing sensor, the period needed for each type of image processing may be different for each line. Therefore, in order to provide a common phase difference ΔT and thereby prevent the reading of image data from taking place before writing thereof in all the lines of the image that is to be displayed, ΔT must be defined so as to have a margin so that reading does not occur prematurely. For example, in defining ΔT, it is necessary to make such considerations as assuming that the maximum period is needed for various types of image processing for all the lines. Consequently, in a configuration in which the period needed for image processing may fluctuate in line units, a delay may occur in line units in the period between capturing of the subject by the image sensor and displaying in the display section.

The present invention was developed in view of the foregoing problems, and an object of the present invention is to satisfactorily display a subject in a display section.

In order to achieve the objects described above, a configuration is adopted in which progress information indicating the progress of processing for generating image data for individual predetermined data units is acquired, and the predetermined data unit for which the processing for generating image data is ended is displayed in a display section based on the progress information. In other words, predetermined data units for which processing for generating image data is ended are displayed in sequence in the display section. Consequently, it is possible to minimize the time lag between display of a certain predetermined data unit and display of the next predetermined data unit, and to shorten the display delay of the subject in the display section.

The predetermined data unit herein may be a single line, a plurality of lines, or another unit. The image data generation section is also preferably capable of generating image data indicating an image of a subject based on output data of an image-capturing section (e.g., an area image sensor), and displaying the image of the subject in the display section based on the image data. The processing for generating image data may be composed of any type of image processing, and the period required for processing may fluctuate according to the output data of the image-capturing sensor, a mode in the image-displaying device, the image-capturing conditions, or other factors. The period required for processing may also be unknown. In other words, since the progress of the processing for generating image data is dynamically specified by the progress information acquisition section, regardless of the type of processing performed, there is no need for the required period thereof to be specified in advance prior to the start of the processing.

The progress information acquisition section is preferably capable of acquiring progress information which indicates the progress of the processing for generating image data for individual predetermined data units. In other words, since a predetermined data unit for which processing for generating image data is ended can be displayed by the display section, the progress information is preferably defined as information whereby it is possible to determine for individual predetermined data units whether the processing for generating image data thereof is ended. Consequently, the progress information may be information directly or indirectly indicating that processing for generating image data is ended for any predetermined data unit.

In the former case (direct information), the information may be composed of information indicating that the processing for generating image data of a single predetermined data unit is ended, information indicating that the processing for generating image data which indicate a pixel which is positioned at the end of a single predetermined data unit and is last to be processed is ended, information indicating a predetermined data unit number of a predetermined data unit targeted for the processing for generating image data, or other information, for example. In the latter case (indirect information), in a case in which the processing for generating image data is composed of a plurality of image processing steps, and the steps include a step in which the required period needed for an image processing step dynamically fluctuates, and a step in which the required period is constant, the information may be composed of information indicating that all steps are ended in which the period needed for an image processing step dynamically fluctuates. In other words, since the required period is constant for steps other than steps in which the period needed for an image processing step may dynamically fluctuate, insofar as it can be specified for a certain predetermined data unit whether a step is ended in which the period needed for an image processing step may dynamically fluctuate, it is possible to specify the timing at which the processing for generating image data ends for the certain predetermined data unit.

The display control section is preferably capable of causing the display section to display a predetermined data unit for which the progress information specifies that processing for generating image data is ended. In other words, the display control section is preferably configured so as to stand by without displaying a predetermined data unit when the processing for generating the image data indicating the predetermined data unit is not ended in image data indicating an image in which a single frame is composed of a plurality of predetermined data units, and to start display of the predetermined data unit in response to ending of the processing for generating the image data.

A configuration in which a plurality of image processing steps is executed by image data generation processing may be assumed as a preferred configuration of the image-displaying device. In this case, by adopting a configuration in which information indicating a predetermined data unit for which the final step of a plurality of image processing steps is ended is acquired as the progress information, it is extremely easy to specify based on the progress information that the processing for generating image data is ended. Therefore, by displaying the predetermined data unit for which the final step of the plurality of image processing steps is ended in the display section, display in the display section can be performed while shortening the display delay of the subject.

In a configuration in which image data are generated which can be displayed in the display section via a plurality of image processing steps based on the output data of the image-capturing sensor, the start timing of execution of each step may be controlled in accordance with the progress of each step for individual predetermined data units. In other words, a relationship is assumed in which processing for generating data of a $Z^{th}$ predetermined data unit by an $(X+1)^{th}$ image processing step among the plurality of image processing steps cannot be started unless data of a $Y^{th}$ predetermined data unit is generated by an $X^{th}$ image processing step among the plurality of image processing steps. In this case, a configuration is assumed in which processing for generating data of the $Z^{th}$ predetermined data unit in the $(X+1)^{th}$ image processing step is started in a case in which a determination is made based on the progress information that the data of the $Y^{th}$ predetermined data unit is generated by the $X^{th}$ image processing step. Through this configuration, the wait time during execution of each image processing step is minimized, and it is possible to minimize the time lag between capture of the subject image by the image-capturing sensor and display thereof by the display section. In this arrangement, X may be any or all natural numbers equal to or less than the number of image processing steps minus one, and Y is any natural number equal to or less than the maximum value of the predetermined data unit number generated by the $X^{th}$ image processing step. The value Z is any natural number equal to or less than the maximum value of the predetermined data unit number generated by the $(X+1)^{th}$ image processing step.

Various configurations may be adopted for controlling the predetermined data unit displayed in the display section. For example, the present invention may be applied to a display section for displaying individual predetermined data units within the output interval of a horizontal synchronization signal. For example, a configuration may be adopted in which a horizontal synchronization signal is outputted in a case in which progress information indicates that processing for generating image data of a single predetermined data unit is ended, and display is performed in the display section based on the image data of the single predetermined data unit for which the generation processing is ended when the horizontal synchronization signal is outputted. In other words, the horizontal synchronization period prescribed by the horizontal synchronization signal is of variable length. Through this configuration, the period spent to display individual predetermined data units can easily be adjusted, and display can easily be performed for individual predetermined data units in accordance with the adjusted period.

It is also possible to apply as a program or a method the technique of the present invention whereby a determination is made for individual predetermined data units as to whether the processing for generating image data is ended based on the progress information, and the predetermined data unit for which the generation processing is ended is displayed. A circuit, device, program, or method such as described above may be implemented as an independent circuit or device, as well as by utilizing a shared component in a circuit or device having multiple functions, and various forms of implementation are included.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described in the following order: (1) Configuration of the image-capturing device; (2) Control of the horizontal synchronization signal; and (3) Other embodiments.

(1) Configuration of Image-Capturing Device

Figure 1:
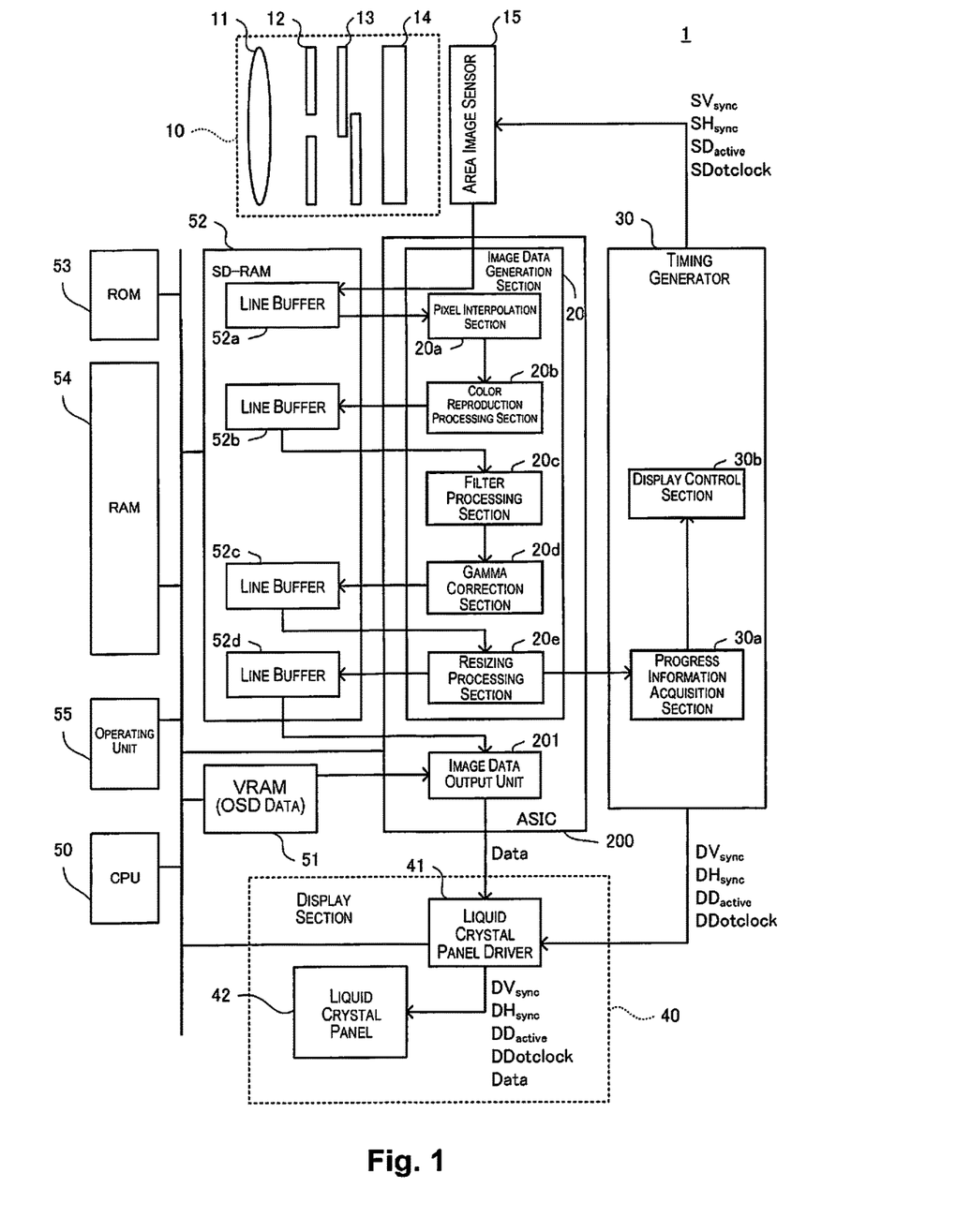
FIG. 1 is a block diagram according to an embodiment of the present invention.

The image-capturing device 1 (image-displaying device) according to an embodiment of the present invention shown in FIG. 1 is provided with an optical system 10, an area image sensor 15 (corresponding to the image-capturing section), an ASIC 200, a timing generator 30, a display section 40, a CPU 50, a VRAM 51, an SD-RAM 52, a ROM 53, a RAM 54, and an operating section 55. The CPU 50 is capable of executing a program recorded in the ROM 53 by appropriately utilizing the VRAM 51, the SD-RAM 52, and the RAM 54, and through this program, the CPU 50 executes a function for generating image data which indicate a subject captured by the area image sensor 15, in accordance with an operation of the operating section 55. The operating section 55 is provided with a shutter button, a dial switch as a mode switching means for switching a mode, a dial switch for switching an aperture and a shutter speed, and a push button for operating various types of setting menus, and a user can issue various types of instructions to the image-capturing device 1 by operating the operating section 55.

The display section 40 is an EVF (electronic view finder) for displaying an image indicating a subject to be captured and allowing the user to comprehend the appearance of the subject prior to the capturing of the image, and image-capturing conditions and other information, and the image-capturing device 1 according to the present embodiment is a mirrorless digital camera provided with an EVF. The display section 40 is provided with an interface circuit not shown in the drawing, a liquid crystal panel driver 41, a liquid crystal panel 42, and an eyepiece lens and other components not shown in the drawing. In the present embodiment, the liquid crystal panel 42 is a high-temperature polysilicon TFT (Thin Film Transistor) provided with three sub-pixels corresponding to three colors of color filters for each pixel, and the positions of the pixels are prescribed by coordinates in an orthogonal coordinate system. A line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction, and a single screen composed of all the pixels of the liquid crystal panel 42 is referred to as a single frame.

The liquid crystal panel driver 41 applies a voltage to each sub-pixel and outputs a signal for driving the liquid crystals to the liquid crystal panel 42. The liquid crystal panel 42 is provided with a gate driver and a source driver not shown in the drawing, and performs display by a process whereby the gate driver controls the display timing in each pixel of each line in accordance with the signal outputted from the liquid crystal panel driver 41, and the source driver applies a voltage that corresponds to the image data of each pixel to each pixel of a line designated by the display timing. In other words, the liquid crystal panel driver 41 is configured so as to output various types of signals for performing display in the liquid crystal panel 42, e.g., a vertical synchronization signal (DVsync) for prescribing a period for display of a single frame; a horizontal synchronization signal (DHsync) for prescribing a period for display of a single line; a data active signal (DDactive) for prescribing a period for importing image data within each line; a data clock signal (DDotclock) for prescribing the import timing of image data of each pixel; and image data (Data) of each pixel.

The image-capturing device 1 according to the present embodiment is provided with the timing generator 30, and the vertical synchronization signal DVsync, the horizontal synchronization signal DHsync, the data active signal DDactive, and the data clock signal DDotclock are generated by the timing generator 30. In other words, the timing generator 30 is provided with a display control section 30b which is provided with a division circuit or the like for generating a signal in which the signal level varies in synchrony with the variation timing of a clock signal having a predetermined cycle outputted from a clock signal generation means. By control of the display control section 30b, the timing generator 30 generates the vertical synchronization signal DVsync, data active signal DDactive, and data clock signal DDotclock in which the signal levels vary at a timing determined in advance. The output timing of the horizontal synchronization signal DHsync is variable in the present embodiment, and the output timing is determined depending on the processing result of a resizing processing section 20e, as described hereinafter.

The liquid crystal panel 42 in the present embodiment is a panel having an XGA-size pixel count provided with 1024 effective pixels in the horizontal direction and 768 effective pixels in the vertical direction, and can display gradations corresponding to the Data in any position by adjusting the content and output timing of the image data Data outputted by the liquid crystal panel driver 41. In the present embodiment, a configuration is adopted in which an image of the subject is displayed based on the output data of the area image sensor 15 in a subject image display region of the liquid crystal panel 42 determined in advance, and characters indicating image-capturing conditions or other information are displayed in an information display region outside the subject image display region. In other words, characters indicating image-capturing conditions or other information are displayed as an OSD (on-screen display) together with the image of the subject in the liquid crystal panel 42. The liquid crystal panel 42 is provided with a large number of pixels in excess of the effective pixels in the horizontal direction and the vertical direction, but in order to simplify the present specification, no description is given of the processing that relates to pixels other than the effective pixels.

The optical system 10 is provided with a lens 11 for forming a subject image on the area image sensor 15, and an aperture 12, a shutter 13, and a low-pass filter 14. Among these components, the lens 11 and the aperture 12 are replaceably attached to a chassis not shown in the drawing. A CMOS (complementary metal oxide semiconductor) image sensor, CCD (charge coupled device) image sensor, or other solid image-capturing element provided with color filters arranged in a Bayer array, and a plurality of photodiodes for accumulating a charge according to a quantity of light by photoelectric conversion for each pixel is used as the area image sensor 15. The positions of the pixels of the area image sensor 15 are prescribed by coordinates in an orthogonal coordinate system, wherein a line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction. A single screen composed of all the pixels of the area image sensor 15 is referred to as a single frame.

In the present embodiment, the area image sensor 15 also operates in synchrony with the various types of signals outputted by the timing generator 30. In other words, the timing generator 30 outputs a vertical synchronization signal (SVsync) for prescribing a period for reading the detection results of the photodiodes for a single frame; a horizontal synchronization signal (SHsync) for prescribing a period for reading the detection results of the photodiodes for a single line; and a data clock signal (SDotclock) for prescribing the read timing and the like of image data of each pixel. The area image sensor 15 starts outputting the output data for a single frame in accordance with the vertical synchronization signal SVsync, and sequentially reads output data which indicate the detection results of the photodiodes corresponding to a portion of the pixels of the area image sensor 15 at a timing in accordance with the data clock signal SDotclock within the period prescribed by the horizontal synchronization signal SHsync.

The ASIC 200 is provided with an image data generation section 20 which is composed of a circuit for performing processing whereby line buffers 52a through 52d for a plurality of lines reserved in advance in the SD-RAM 52 are utilized, and image data for displaying an image of the subject in the display section 40 are generated by pipeline processing. The line buffers 52a through 52d for a plurality of lines may also be provided to the image data generation section 20 or another component. The display section 40 displays the subject on the liquid crystal panel 42 based on the generated image data. In other words, the user can confirm the subject while utilizing the display section 40 as an EVF. The ASIC 200 may also be an image processing DSP (digital signal processor).

In a case in which the user operates the operating section 55 to issue an image capture instruction, in response to the image capture instruction, the area image sensor 15 starts outputting the output data for a single frame in accordance with the vertical synchronization signal SVsync, and sequentially reads the output data which indicate the detection results of the photodiodes corresponding to all of the effective pixels of the area image sensor 15 at a timing in accordance with the data clock signal SDotclock within the period prescribed by the horizontal synchronization signal SHsync. The image data generation section 20 then utilizes the SD-RAM 52 or another component to generate image data in a JPEG format or other format, and the image data are recorded in a removable memory or the like not shown in the drawing. In other words, the user can generate image data for indicating the subject.

(2) Control of Horizontal Synchronization Signal

Figure 2:
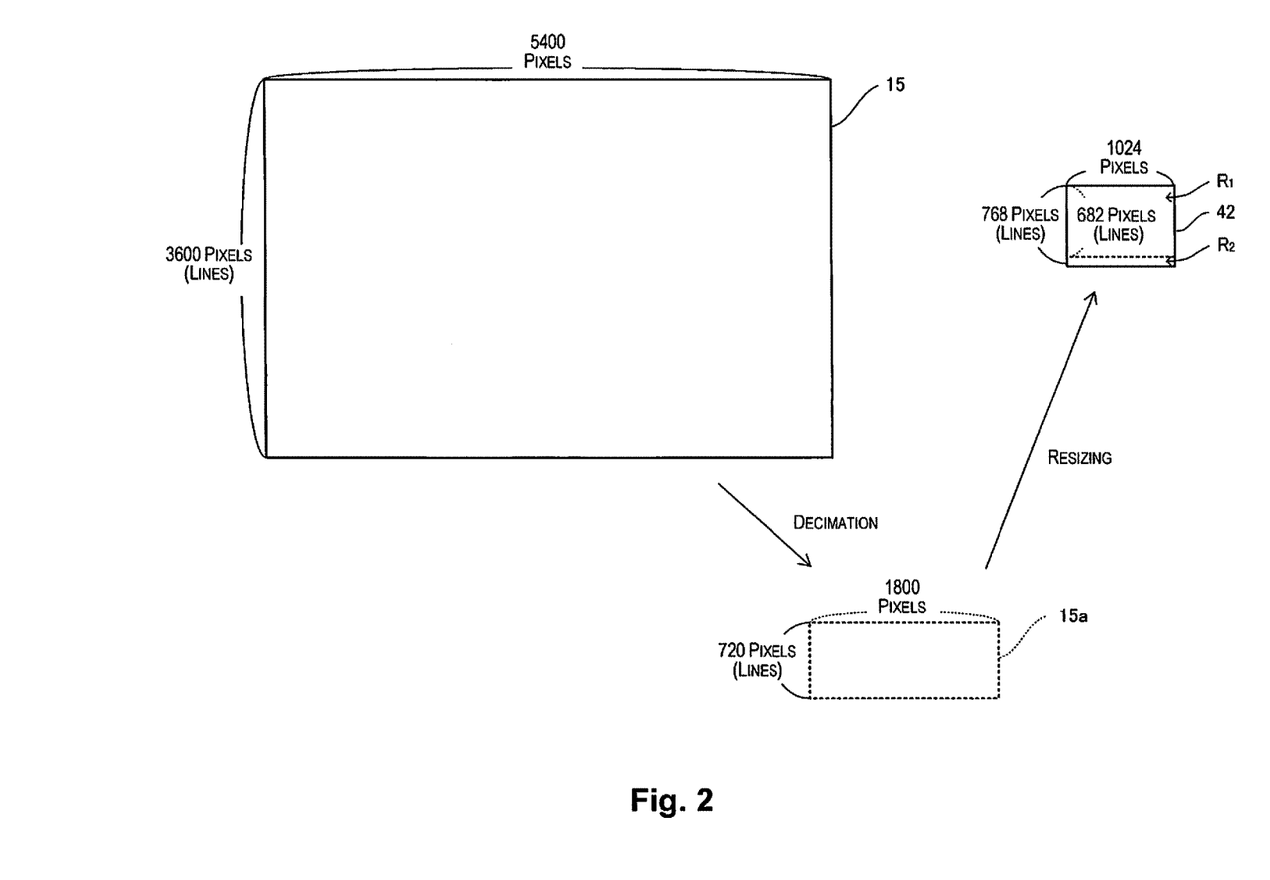
FIG. 2 is a diagrammatic view showing the number of pixels of the area image sensor and the liquid crystal panel.

In a case in which image data indicating a subject are recorded in the removable memory or the like, and printing or another operation is considered, the number of pixels of the area image sensor 15 must be greater than a predetermined number in order to obtain high-quality image data. Therefore, the effective number of pixels of the area image sensor 15 in the present embodiment is 5400 pixels in the horizontal direction and 3600 pixels in the vertical direction, as shown in FIG. 2. The area image sensor 15 is provided with a large number of pixels in excess of the effective pixels in the horizontal direction and the vertical direction, but in order to simplify the present specification, no description is given of the processing that relates to pixels other than the effective pixels.

On the other hand, the liquid crystal panel 42 is provided with 1024 pixels in the horizontal direction and 768 pixels in the vertical direction, as described above, and is configured so that the image of the subject is displayed in the subject image display region (R1 shown in FIG. 2). In the present embodiment, in order to display the image of the subject as large as possible while maintaining the aspect ratio (2:3) of the area image sensor 15, a rectangular region having an aspect ratio of 2:3 in which the top edge and left and right edges are adjacent to the top edge and left and right edges of the liquid crystal panel 42 is used as the subject image display region R1 for displaying the image of the subject. The remaining region is the information display region (region shown in FIG. 2) for displaying characters indicating image-capturing conditions or other information. Consequently, the subject image display region R1 in the liquid crystal panel 42 is composed of 1024 pixels in the horizontal direction and 682 pixels in the vertical direction. As described above, the number of pixels of the area image sensor 15 and the number of pixels of the liquid crystal panel 42 are not the same in the present embodiment.

Furthermore, since the display in the display section 40 is utilized by the user to confirm the subject, when the delay between the timing at which the subject is captured by the area image sensor 15 and the timing at which the image of the captured subject is displayed by the display section 40 increases sufficiently to be noticeable by the user, the subject seen in the EVF and the recorded image of the subject are misaligned, and the EVF becomes extremely difficult to use. The delay must therefore be minimal when the display section 40 is used as an EVF.

Therefore, in order for the image captured by the area image sensor 15 to be displayed in the display section 40 so that the delay is so extremely short as to not be seen by the human eye, a configuration is adopted in the present embodiment whereby various types of processing are performed by the area image sensor 15 and the image data generation section 20, and the display section 40 causes the image data generated as a result of the processing to be displayed at high speed.

In other words, the area image sensor 15 according to the present embodiment is provided with a circuit capable of executing interlaced scanning for reading the detection results of the photodiodes at a ratio of 1 for every n (where n is an odd number) lines aligned in the vertical direction. An adder is also provided for adding m (where m is a natural number) detection results aligned in the horizontal direction among the photodiodes for performing photoelectric conversion via color filters of the same color, and outputting l/m of the sum (i.e., outputting the arithmetic average of the m detection results). The present embodiment is configured so that when the display section 40 is caused to function as an EVF, interlaced scanning and processing by the adder are executed in the area image sensor 15, whereby pixels in the horizontal direction and the vertical direction are decimated, and the output data of a smaller number of pixels than the number of pixels provided to the area image sensor 15 are outputted, and the subject can thereby be captured at high speed.

Figure 3:
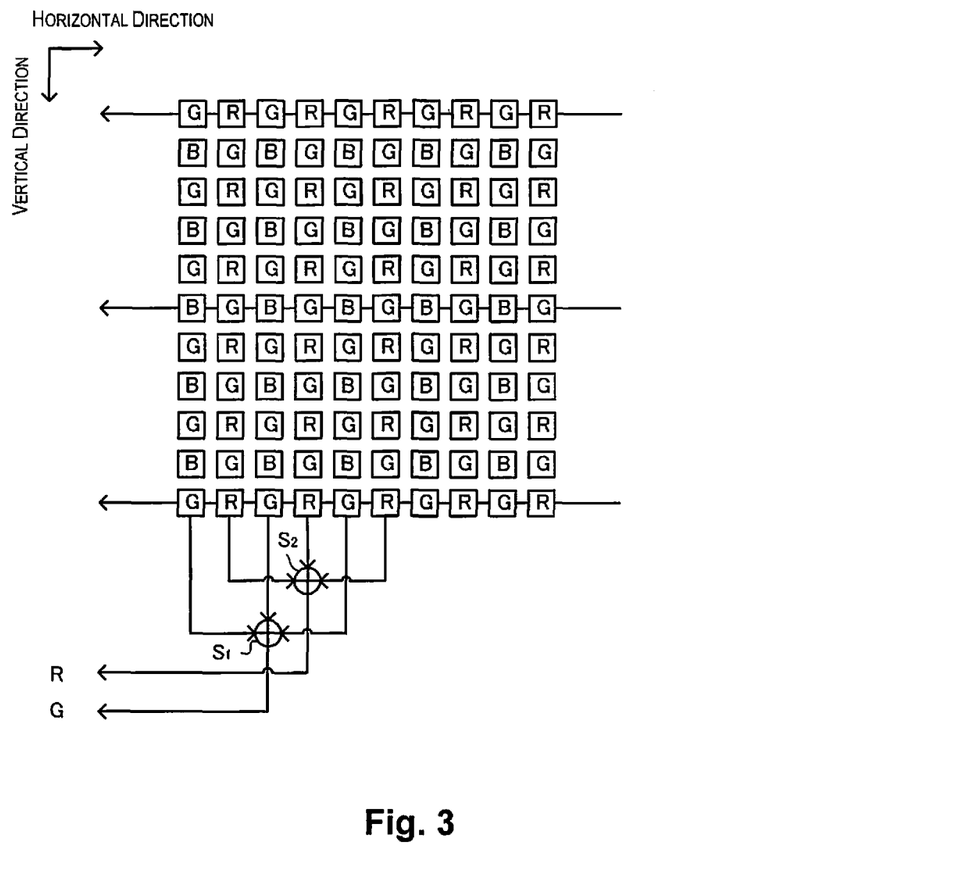
FIG. 3 is a view showing an example of the method for outputting the output data of the area image sensor.

In other words, in a live view mode for causing the display section 40 to function as an EVF, the area image sensor 15 reads for lines in the vertical direction at a ratio of 1 for every n lines in accordance with the horizontal synchronization signal SHsync. Processing for outputting the result of arithmetically averaging the detection results of m photodiodes by the adder is also performed in accordance with the data clock signal SDotclock. FIG. 3 shows an example of the method for outputting the output data of a smaller number of pixels than the number of pixels provided to the area image sensor 15 in the present embodiment. In FIG. 3, the rectangles labeled R indicate photodiodes that correspond to color filters for transmitting light in a red spectrum, the rectangles labeled G indicate photodiodes that correspond to color filters for transmitting light in a green spectrum, and the rectangles labeled B indicate photodiodes that correspond to color filters for transmitting light in a blue spectrum.

As shown in FIG. 3, in a case in which the color filters of the pixels indicated by rectangles are in a Bayer array, since a color filter of only one color corresponds to each pixel, the color of each pixel must be interpolated by utilizing the surrounding pixels. Therefore, when lines are decimated to acquire the output data, decimation must be performed so that the color filters of adjacent lines after decimation are of a different color. Therefore, in the present embodiment, by acquiring the detection values in the photodiodes of each line at a ratio of 1 line for every n lines (where n is an odd number) as the output data, it is possible to acquire output data in which the color of each pixel can be specified by interpolation. In the present embodiment, a configuration is adopted in which the output data are acquired at a ratio of 1 line for every 5 lines in order to make the number of lines in the vertical direction of the area image sensor 15 as close as possible to the number of lines in the vertical direction of the subject image display region R1 of the liquid crystal panel 42. In FIG. 3, the left-directed arrows indicate that output data are acquired at a ratio of 1 line for every 5 lines, and in this example, the number of lines in the vertical direction is ⅕, i.e., 720.

In a case in which the color filters are in a Bayer array, the colors of adjacent pixels in the horizontal direction are different, and the same color of color filter occurs at every other position. Therefore, decimation processing can essentially be performed by adding m at every other pixel for pixels aligned in the horizontal direction and multiplying the sum by l/m (i.e., calculating the arithmetic average of m detection results). In the present embodiment, m is set to 3, due to such factors as limitations for the sake of image quality in cases in which adding is performed by the adder. In the configuration shown in FIG. 3, in the lowest line shown, the detection results of the three photodiodes aligned in the horizontal direction that are photodiodes for performing photoelectric conversion via green color filters are added by an adder S1 and multiplied by ⅓, and the detection results of the three photodiodes aligned in the horizontal direction that are photodiodes for performing photoelectric conversion via red color filters are added by an adder S2 and multiplied by ⅓. In this example, the number of pixels in the horizontal direction is ⅓, i.e., 1800 pixels. In FIG. 2, the data size after decimation in the area image sensor 15 is indicated by the dashed-line rectangle 15*a*.

As described above, in the area image sensor 15, the number of lines in the vertical direction may be set to 720, and the number of pixels in the horizontal direction may be set to 1800. However, in such decimation, since n is an odd number in the vertical direction, m is a natural number in the horizontal direction, and there are other such limitations for the sake of image quality, the number of pixels after decimation and the number of pixels of the subject image display region R1 of the liquid crystal panel 42 do not readily coincide. In a case in which n and m differ, as described above, the aspect ratio differs between the subject and the subject image on the liquid crystal panel 42.

A configuration is therefore adopted in the present embodiment in which resizing is further performed in the image data generation section 20 for the decimated output data, and image data are generated for display in the subject image display region R1 of the liquid crystal panel 42. In other words, the image data generation section 20 is provided with a pixel interpolation section 20*a*, a color reproduction processing section 20*b*, a filter processing section 20*c*, a gamma correction section 20*d*, and a resizing processing section 20*e*. In this configuration, the number of pixels in the vertical direction and the horizontal direction is modified by the resizing processing section 20*e* in the process of generating the image data, and image data are generated which are equivalent to the number of pixels of the subject image display region R1 of the liquid crystal panel 42.

The line buffer 52*a* is a buffer memory for temporarily recording the decimated output data outputted from the area image sensor 15, and when the decimated output data are outputted from the area image sensor 15, the output data are temporarily recorded in the line buffer 52*a* by the processing of the image data generation section 20. The pixel interpolation section 20*a* imports data of the necessary number of pixels for generating the colors of the two channels missing in each pixel in the Bayer array from the line buffer 52*a*, and while doing so, generates the colors of the two channels by interpolation processing. As a result, three channels of data are generated in each pixel. The color reproduction processing section 20*b* then performs color conversion processing for color matching by performing a 3×3 matrix computation based on the generated data. The data generated by color conversion processing are temporarily recorded in the line buffer 52*b*. The filter processing section 20*c* then executes sharpness adjustment, noise removal processing, and other processing by filter processing. The gamma correction section 20*d* then executes gamma correction to compensate for a characteristic difference between the colors indicated by the gradation values of the output data of the area image sensor 15 and the colors indicated by the gradation values of the image data handled by the display section 40. The data generated by gamma correction are temporarily recorded in the line buffer 52*c*.

The data recorded for each line, i.e., line by line, in the line buffer 52*c* are the number of pixels decimated in the area image sensor 15. In other words, data of 720 lines in the vertical direction and 1800 pixels in the horizontal direction are recorded line by line. The resizing processing section 20*e* performs resizing by sequentially referencing the data recorded in the line buffer 52*c* to perform interpolation computation processing and specify the gradation value of each channel in the positions between pixels. In the present embodiment, since the decimation in the area image sensor 15 described above is ⅕ in the vertical direction and ⅓ in the horizontal direction, the aspect ratio of the decimated data differs from the aspect ratio of the output data of the area image sensor 15, as shown in the rectangle 15*a* in FIG. 2. Therefore, the resizing processing section 20*e* first performs reduction processing for reduction to a size of approximately 57% in the horizontal direction based on the data recorded in the line buffer 52*c*. As a result, the number of pixels in the horizontal direction is set to 1024. The resizing processing section 20*e* also performs reduction processing for reduction to a size of approximately 95% in the vertical direction. As a result, image data are generated for which there are 1024 pixels in the horizontal direction and 682 lines in the vertical direction. The generated image data are recorded line by line in the line buffer 52*d*.

In the present embodiment, by the processing described above, generation processing is performed for generating image data that can be displayed in the subject image display region R1 of the liquid crystal panel 42 based on the output data of the area image sensor 15, but the output data of the area image sensor 15 have 720 lines in the vertical direction, whereas the number of lines of the image data in the vertical direction is 682, and the number of lines of the liquid crystal panel 42 in the vertical direction is 768. In other words, different numbers of lines are required to capture a single frame and to display a single frame.

Therefore, in the present embodiment, the horizontal synchronization signal SHsync, the vertical synchronization signal SVsync, the data active signal SDactive, and the data clock signal SDotclock of the area image sensor 15 are set to the cycle necessary for driving the area image sensor 15.

In other words, the timing generator 30 outputs the horizontal synchronization signal SHsync the number of times and at the timing whereby the decimation in the vertical direction such as described above can be performed in the area image sensor 15, and the output data of the number of lines of a single frame can be acquired within the period prescribed by the vertical synchronization signal SVsync. The timing generator 30 also outputs the data clock signal SDotclock the number of times and at the timing whereby decimation in the horizontal direction such as described above can be performed, and the output data of the number of pixels of a single line can be acquired within the period prescribed by the horizontal synchronization signal SHsync.

On the other hand, in order to minimize the delay period and perform display in the liquid crystal panel 42 based on the output data outputted line by line from the area image sensor 15, a configuration is adopted in the present embodiment whereby the horizontal synchronization signal DHsync is outputted at the time that the image data for display of each line of the liquid crystal panel 42 are prepared. In other words, the liquid crystal panel 42 in the present embodiment is capable of displaying lines for which processing by the resizing processing section 20e is ended. The timing generator 30 therefore outputs the horizontal synchronization signal DHsync for displaying the $N^{th}$ line in the vertical direction of the liquid crystal panel 42 at the time that the processing for generating the image data of the $N^{th}$ line (where N is a natural number) is ended.

Specifically, the timing generator 30 is provided with a progress information acquisition section 30a, and the progress information acquisition section 30a is capable of acquiring, from the resizing processing section 20e, progress information for indicating a line for which the processing for generating image data is ended in the resizing processing section 20e. Consequently, through this progress information, it is possible to specify a line that can be displayed in the liquid crystal panel 42 based on the image data. Therefore, in this configuration, the timing generator 30 outputs the horizontal synchronization signal DHsync in synchrony with the timing at which the processing for generating the image data of each line is ended, and display of a line for which the processing for generating the image data is thereby started in the liquid crystal panel 42. Through this configuration, display of each line does not start before preparation of the image data is finished, and each line can be immediately displayed with the display preparation thereof is finished.

Since the liquid crystal panel 42 is preferably capable of displaying the pixels of each line of the liquid crystal panel 42 within the horizontal synchronization period prescribed by the output timing of the horizontal synchronization signal DHsync, the timing generator 30 outputs the data active signal DDactive and the data clock signal DDotclock so that the pixels of a single line can be displayed within a period assumed to be the period in which the horizontal synchronization period prescribed by the output timing of the horizontal synchronization signal DHsync is shortest.

In the present embodiment, the vertical synchronization signal SVsync of the area image sensor 15 and the vertical synchronization signal DVsync of the liquid crystal panel 42 are set so as to be synchronized in order to prevent the output data from the area image sensor 15 and the display by the liquid crystal panel 42 from becoming inconsistent by frame units. In other words, the timing generator 30 outputs the vertical synchronization signal DVsync of the display section 40 after a predetermined period from the timing at which the vertical synchronization signal SVsync of the area image sensor 15 is outputted. As a result, the cycles of the vertical synchronization signals SVsync, DVsync are the same and constant in the present embodiment. Consequently, the display in the liquid crystal panel 42 of the subject captured by the area image sensor 15 is not delayed by the period of a single frame or longer, and a display of an image of the subject captured at the same timing does not remain on the liquid crystal panel 42 for a period of a plurality of frames.

Since the horizontal synchronization period prescribed by the horizontal synchronization signal DHsync of the liquid crystal panel 42 is of variable length in the present embodiment, the cycles of the vertical synchronization signals SVsync, DVsync are the same and constant even when the horizontal synchronization period varies. Specifically, the timing generator 30 controls the output signal so that the vertical synchronization period for displaying a single frame is constant by lengthening or shortening the horizontal synchronization period with respect to a reference period TH determined in advance, and thereby canceling out the time fluctuation from a reference period TH. The reference period TH is configured as the horizontal synchronization period in a case in which each of the total number of lines of the liquid crystal panel 42 is displayed for an equal period within the vertical synchronization period.

In the subject image display region R1, a state is attained in which the horizontal synchronization period can be lengthened by waiting to output the horizontal synchronization signal DHsync until the processing for generating the image data of each line is ended. In the information display region R2 of the liquid crystal panel 42 for displaying characters indicating image-capturing conditions or other information, the horizontal synchronization period is made shorter than the reference period TH so as to cancel out the cumulative total of the difference of the horizontal synchronization period lengthened in the subject image display region R1 and the reference period TH.

Figure 4:
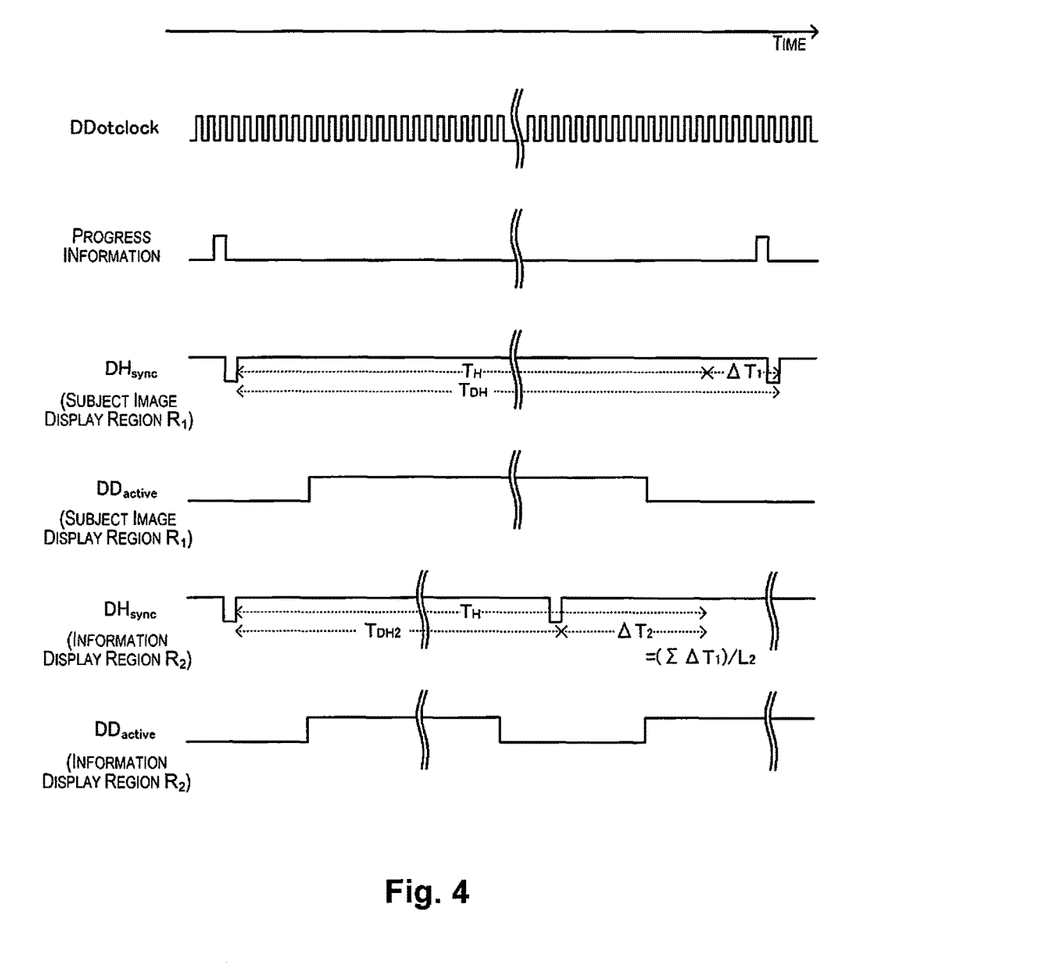
FIG. 4 is a timing chart showing the signals applied to the display section according to the present embodiment.

FIG. 4 shows the horizontal synchronization signal DHsync outputted from the timing generator 30 configured as described above, and also shows the data active signal DDactive, the data clock signal DDotclock, and the progress information. The progress information outputted from the resizing processing section 20e in the present embodiment is composed of a single pulse in which a low-level output is maintained as the processing for generating the image data for a single line is being executed, and a high-level output occurs at a predetermined period at the time that the processing for generating the image data for a single line is ended.

When the timing generator 30 acquires the progress information through the progress information acquisition section 30a, the horizontal synchronization signal DHsync is outputted in synchrony with the pulse of the progress information by the processing of the display control section 30b. Therefore, even in a case in which the processing for generating the image data of a certain line fails to occur within the reference period TH, the horizontal synchronization signal DHsync is not outputted until the generation processing is ended, and a horizontal synchronization period TDH becomes longer than the reference period TH. Consequently, in a case in which the processing for generating the image data of a certain line fails to occur within the reference period TH, display of the certain line is not started in the liquid crystal panel 42 until the generation processing is completed. Display is also not performed before preparation of the image data of each line is ended. Furthermore, since the horizontal synchronization signal DHsync is outputted when the processing for generating the image data of a certain line is ended, the image data of each line is displayed without delay when preparation thereof is ended. As described above, since the liquid crystal panel 42 in the present embodiment is driven in a state in which the horizontal synchronization period TDH may be longer than the reference period TH, the present invention is suitable for application to a situation in which the period for generating the image data of a single line to be displayed by the liquid crystal panel 42 may fluctuate. A possible example of such a situation is one in which the speed of data output processing of the area image sensor 15 or the processing for generating image data by the image data generation section 20 may differ for each line. The present invention may also, of course, be applied in a situation in which the processing speed differs for each line depending on the image-capturing conditions or the hardware used for capturing and image. For example, the present invention can be applied to a configuration in which the vertical synchronization period or the horizontal synchronization period of the area image sensor 15 fluctuates, or the period needed for processing for generating image data fluctuates due to an operation of the operating section 55 by the user. The present invention can also be applied to a configuration in which the vertical synchronization period or the horizontal synchronization period of the area image sensor 15 fluctuates, or the period needed for processing for generating image data fluctuates due to the changing of an interchangeable EVF or an interchangeable lens.

As described above, in the subject image display region R1 in the present embodiment, the timing generator 30 adjusts the horizontal synchronization period TDH in accordance with the progress information outputted from the resizing processing section 20*e*. The horizontal synchronization signal DHsync may therefore be lengthened according to the progress of the processing for generating the image data to be displayed in the subject image display region R1, and the horizontal synchronization period TDH prescribed by the horizontal synchronization signal DHsync of the liquid crystal panel 42 is not necessarily constant. On the other hand, since the vertical synchronization period prescribed by the vertical synchronization signal DVsync is constant in the present embodiment, as described above, the timing generator 30 sets the output timing of the horizontal synchronization signal DHsync so that a horizontal synchronization period TDH2 is shorter than the abovementioned reference period TH in the information display region R2, so that displaying of all the lines of the liquid crystal panel 42 ends within the vertical synchronization period even in a case in which the horizontal synchronization period TDH in the subject image display region R1 is lengthened.

In other words, since the data (referred to as OSD data) of the characters indicating the image-capturing conditions or other information can be created in advance and recorded in advance in the VRAM 51 irrespective of operation of the area image sensor 15, an appropriate display can be performed without overtaking the reading of data even when a display based on the OSD data is executed according to a short horizontal synchronization period. Therefore, in the present embodiment, the horizontal synchronization period in the information display region R2 for displaying characters indicating image-capturing conditions or other information is set so as to be shorter than that of the subject image display region R1 for producing a display based on the output data of the area image sensor 15.

Specifically, the timing generator 30 adjusts the output timing of the horizontal synchronization signal DHsync, and thereby shortens the horizontal synchronization period TDH2 so that the sum of the differences of the lengthened horizontal synchronization period TDH and the reference period TH in the subject image display region R1, and the sum of the differences of the shortened horizontal synchronization period TDH2 and the reference period TH in the information display region R2 coincide. As a result, the following relation obtains: horizontal synchronization period TDH2<reference period≤horizontal synchronization period TDH. Various configurations can be adopted in the information display region R2 as configurations whereby the horizontal synchronization signal DHsync is outputted so that the horizontal synchronization period TDH2 is shorter than the reference period TH. For example, as shown in FIG. 4, a configuration may be adopted in which the period of shortening in each line is the value $\Delta T2$ obtained by dividing the sum ($Z\Delta T1$) of the delay $\Delta T1$ with respect to the horizontal synchronization period TDH by the number of lines L2 of the information display region R2, the delay $\Delta T1$ being generated in the subject image display region R1. In other words, a configuration may be adopted in which the value of horizontal synchronization period TDH-$\Delta T2$ is assumed to be the horizontal synchronization period TDH2 in the information display region R2.

As described above, in order to produce a suitable display in each region based on the horizontal synchronization signal adjusted for each region of the liquid crystal panel 42 in the present embodiment, the line numbers of the portions of the liquid crystal panel 42 that correspond to the subject image display region R1 and the information display region R2 are determined in advance. For example, in the example shown in FIG. 2, lines 1 through 682 are the subject image display region R1, and lines 683 through 768 are the information display region R2. Therefore, the timing generator 30 outputs the horizontal synchronization signal DHsync so that the horizontal synchronization period TDH2 is shorter than the abovementioned reference period TH during display in the information display region R2 that corresponds to lines 683 through 768, while the timing generator 30 outputs the horizontal synchronization signal DHsync at a timing in accordance with the abovementioned progress information during display in the subject image display region R1 that corresponds to lines 1 through 682.

The ASIC 200 is also provided with an image data output section 201, and the image data output section 201 outputs the image data (Data) recorded in the line buffer 52*d* to the display section 40 line by line during display of lines 1 through 682 of the liquid crystal panel 42. As a result, the image of the subject captured by the area image sensor 15 is displayed in the subject image display region R1. The CPU 50 records OSD data to the VRAM 51 prior to at least display in an information display region R2. During display in lines 683 through 768 of the liquid crystal panel 42, the image data output section 201 outputs the OSD data recorded in the VRAM 51 to the display section 40 line by line as the image data (Data). As a result, characters indicating image-capturing conditions and the like are displayed in the information display region R2.

Through this configuration, display of image-capturing conditions or other information by the OSD data is performed within a short horizontal synchronization period in the information display region R2, while the subject captured by the area image sensor 15 is displayed in the subject image display region R1 in a state of minimal delay. Since the horizontal synchronization period is also controlled as described above so that the sum of the differences of the lengthened horizontal synchronization period TDH and the reference period TH in the subject image display region R1, and the sum of the differences of the shortened horizontal synchronization period TDH2 and the reference period TH in the information display region R2 coincide, display by the display section 40 can be performed in a state in which the cycles of the vertical synchronization signals SVsync, DVsync are the same and constant. Consequently, the display in the liquid crystal panel 42 of the subject captured by the area image sensor 15 is not delayed by the period of a single frame or longer, and the same image does not remain displayed on the liquid crystal panel 42 for a plurality of frame periods.

(3) Other Embodiments

The embodiment described above is an example of an implementation of the present invention, and the present invention is not limited to a configuration in which determination is made based on progress information for each line as to whether processing for generating image data is ended, and a line for which the generation processing is ended is displayed. A configuration may be adopted in which a determination is made based on progress information as to whether processing for generating image data is ended for individual predetermined data units, the predetermined data units being i lines, j pixels (where i and j are natural numbers), or other units, and a predetermined data unit for which the generation processing is ended is displayed. The embodiments described hereinafter may also be combined with the embodiment described above, and various other embodiments are also possible.

For example, a back porch of the horizontal synchronization signal DHsync may be lengthened when the horizontal synchronization period TDH is made longer than the reference period TH. In this configuration, the output period of progress information from the resizing processing section 20e is detected in the progress information acquisition section 30a in the configuration shown in FIG. 1. In other words, the period TS(N−1) is detected between the progress information outputted at the time that processing for generating the image data of the $(N-1)^{th}$ line is ended and the progress information outputted at the time that processing for generating the image data of the $N^{th}$ line is ended. The timing generator 30 then determines the length of the back porch of the horizontal synchronization signal DHsync of the $N^{th}$ line based on the period TS(N−1), and outputs various types of signals.

Figure 5:
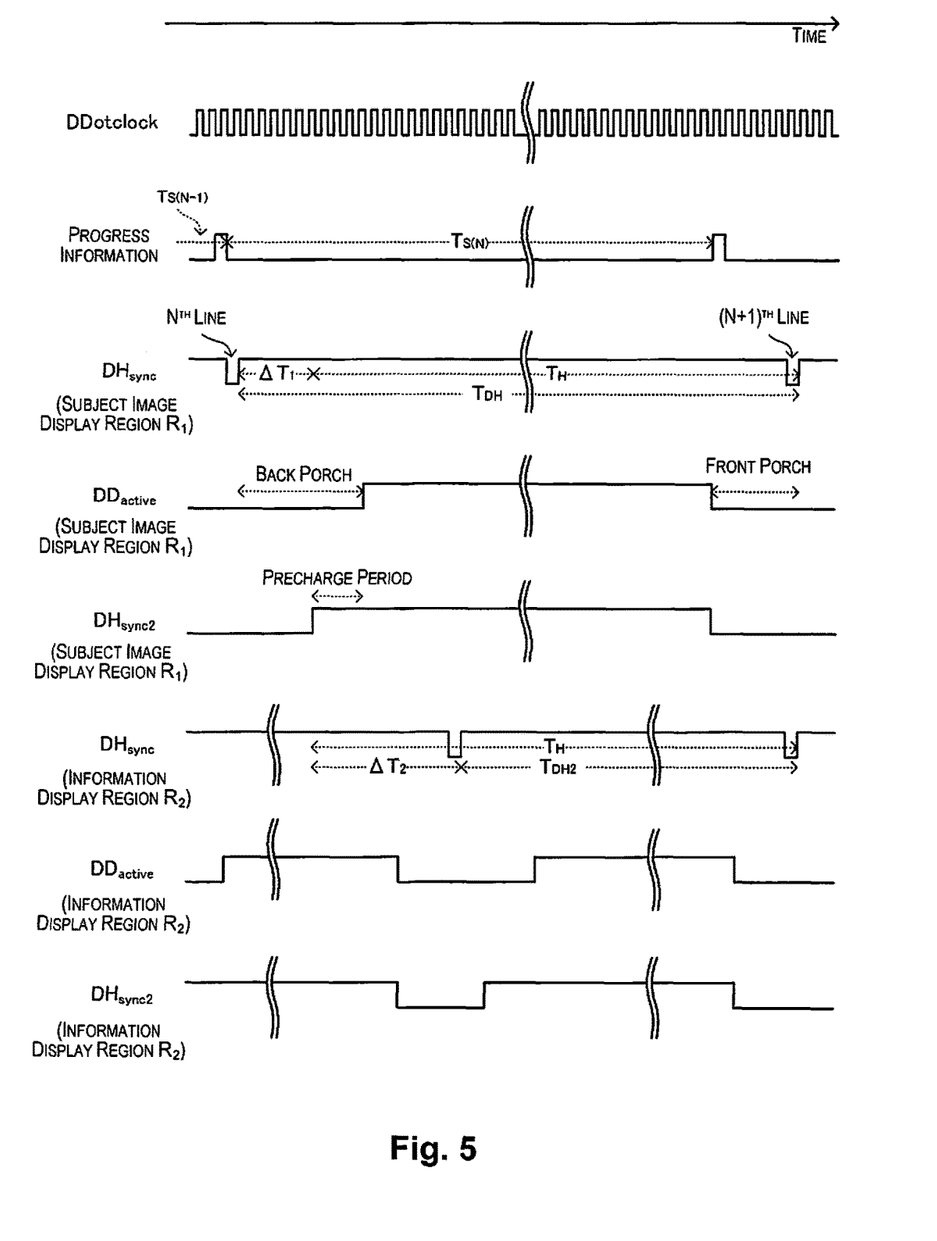
FIG. 5 is a timing chart according to another embodiment of the present invention.

In other words, by the processing of the display control section 30b, the timing generator 30 outputs a signal DHsync2 indicating a precharge period when a period ΔT1 has elapsed after outputting of the horizontal synchronization signal DHsync of the $N^{th}$ line, as shown in FIG. 5, the period ΔT1 being obtained by subtracting the length of the reference period TH from the length of the period TS(N−1). By the processing of the display control section 30b, the timing generator 30 then outputs DDactive when the predetermined precharge period has elapsed after outputting of the signal DHsync2, and outputs the horizontal synchronization signal DHsync of the $(N+1)^{th}$ line, providing a front porch having a predetermined period after maintaining the level of DDactive until the data clock signal DDotclock of the number of pixels of a single line is outputted. The period from the start of the precharge period until the end of the front porch coincides with the reference period TH. Consequently, the horizontal synchronization period TDH, which is the period between the horizontal synchronization signal DHsync of the $N^{th}$ line and the horizontal synchronization signal DHsync of the $(N+1)^{th}$ line, is the sum of the reference period TH and ΔT1. As a result, N lines can be displayed with precharging, inversion, and other operations synchronized with the signal DHsync2 in the liquid crystal panel 42, and the horizontal synchronization period TDH can be made longer than the reference period TH.

In the first embodiment described above, since the front porch of the horizontal synchronization signal DHsync is lengthened, the back porch period can be set as a constant period, and the period for performing precharging, inversion, and other operations can be provided according to normal specifications.

In the embodiment described above, the horizontal synchronization signal SHsync is outputted so that the horizontal synchronization period is shorter in the information display region R2 of the liquid crystal panel 42 than in the subject image display region R1, in order to cause the cycle of the vertical synchronization signal SVsync of the area image sensor 15 and the cycle of the vertical synchronization signal DVsync of the liquid crystal panel 42 to coincide, but the cycle of the vertical synchronization signal SVsync and the cycle of the vertical synchronization signal DVsync of the liquid crystal panel 42 can be made to coincide by another method. For example, since the area image sensor 15 has a larger number of lines than the liquid crystal panel 42 in a normal image-capturing device, in a case in which the horizontal synchronization period that should be maintained within a specific vertical synchronization period is assumed to be equal, the horizontal synchronization signal DHsync of the liquid crystal panel 42 is shorter than the horizontal synchronization signal SHsync of the area image sensor 15. Consequently, even in a case in which the horizontal synchronization signal DHsync of the liquid crystal panel 42 is lengthened, it is not often necessary to lengthen the vertical synchronization period of the liquid crystal panel 42 according to the lengthening of the horizontal synchronization signal DHsync. In a case in which lengthening the horizontal synchronization signal DHsync causes the vertical synchronization signal DVsync of the liquid crystal panel 42 to be longer than the vertical synchronization signal SVsync of the area image sensor 15, the vertical synchronization signal SVsync of the area image sensor 15 may be lengthened, and the vertical synchronization signal DVsync and vertical synchronization signal SVsync may be synchronized.

In the embodiment described above, a configuration is adopted in which progress information is acquired which indicates for each line whether the resizing processing of the processing for generating image data is ended, but any configuration may be adopted insofar as progress information for the processing of the final step is acquired, even in a case in which the final step of the processing for generating the image data is not the resizing processing. A configuration may also be adopted in which the progress information is acquired for processing of a step prior to the final step (e.g., a step in which the processing time may fluctuate), insofar as processing can be performed at such a high speed that the processing time of the final step of processing for generating the image data can be ignored, processing can be performed in a certain time, or it is possible to predict the ending of the final step. In a case in which an image processing step is included for referencing the data of a plurality of lines and generating data of a single line in the processing for generating the image data, the progress information may be acquired for the included step. The timing at which the processing for generating image data is ended may thus be computed based on the progress information, or specified as the timing at which the progress information is acquired.

Figure 6:
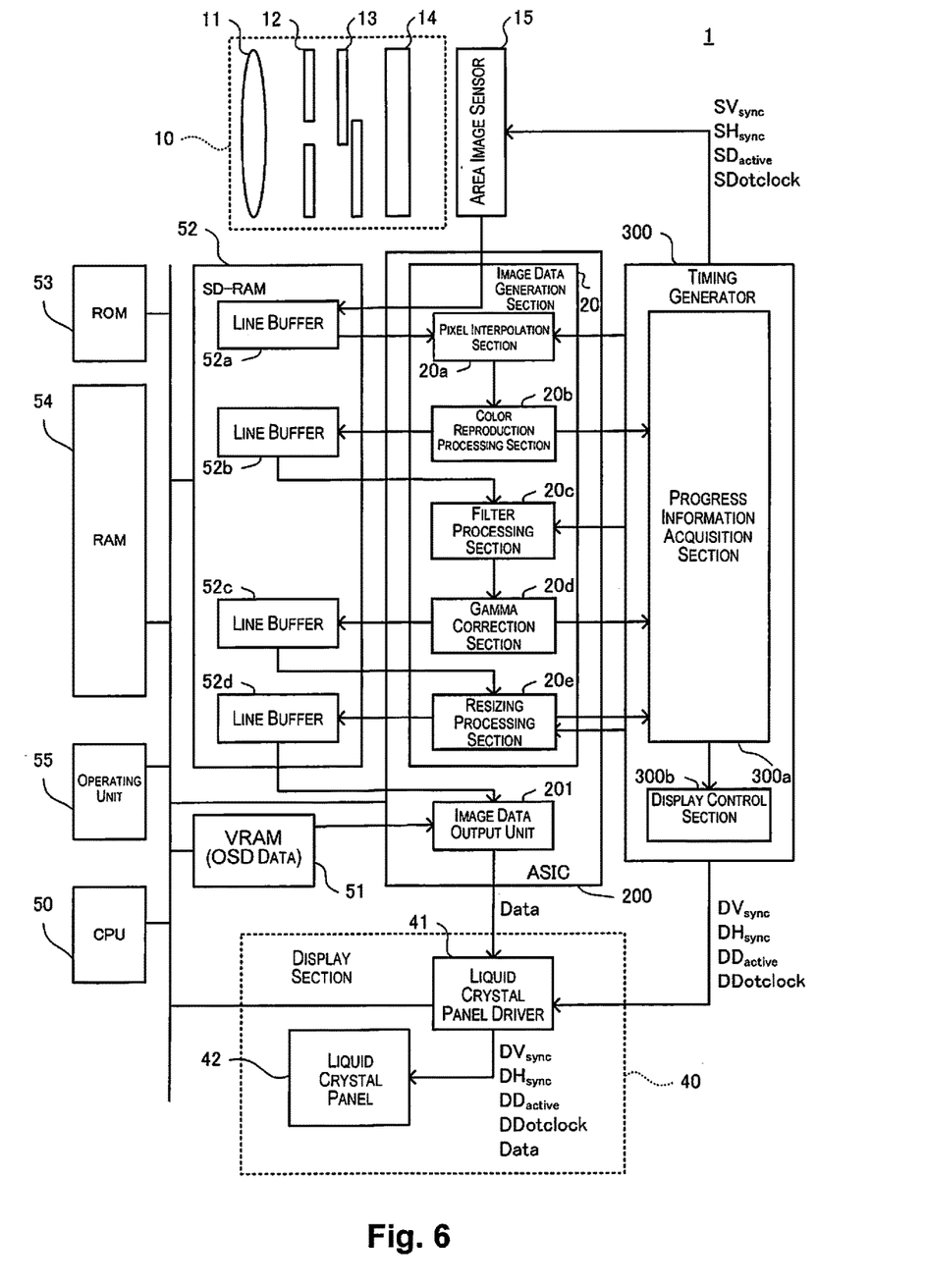
FIG. 6 is a block diagram according to another embodiment of the present invention.

FIG. 6 is a view showing an image-capturing device 1 that is configured so as to acquire progress information for a plurality of image processing steps for referencing the data of a plurality of lines to generate data of a single line. In FIG. 6, the same reference symbols as those of FIG. 1 are used to refer to constituent elements that are the same as those in FIG. 1. A timing generator 300 of the image-capturing device 1 shown in FIG. 6 is capable of acquiring progress information which indicates a line for which outputting of the output data from the area image sensor 15 is completed, and a line for which the processing for generating data in each of the color reproduction processing section 20b, the gamma correction section 20d, and the resizing processing section 20e of the image data generation section 20 is ended. By the processing of a display control section 300b, the timing generator 300 is capable of outputting a trigger signal (e.g., a horizontal synchronization signal) for starting processing for generating data of a single line to each of the pixel interpolation section 20a, the filter processing section 20c, and the resizing processing section 20e.

In other words, in this embodiment, the image processing steps include an $X^{th}$ image processing step and an $(X+1)^{th}$ image processing step, where X is a natural number equal to or less than (a total number of the image processing steps–1), with the $X^{th}$ image processing step and the $(X+1)^{th}$ image processing step being in a relationship such that processing for generating a $Z^{th}$ one of the predetermined data units, where Z is a natural number, by the $(X+1)^{th}$ image processing step cannot be started unless a $Y^{th}$ one of the predetermined data units, where Y is a natural number, is generated by the $X^{th}$ image processing step. Then, the display control section 300b of the timing generator 300 is configured to cause the image data generation section 20 to start the processing for generating the $Z^{th}$ one of the predetermined data units by the $(X+1)^{th}$ image processing step when the progress information specifies that the $Y^{th}$ one of the predetermined data units has been generated by the $X^{th}$ image processing step.

More specifically, in the embodiment shown in FIG. 6, processing of data of an $L^{th}$ line can be executed in the pixel interpolation section 20a when the output data of a $K^{th}$ line is outputted from the area image sensor 15, and as a result of line-by-line processing by the pixel interpolation section 20a and the color reproduction processing section 20b, determination is made in advance that the processing of data of an $M^{th}$ line in the filter processing section 20c can be executed when processing of the data of the $L^{th}$ line is ended. As a result of line-by-line processing by the filter processing section 20c and the gamma correction section 20d, determination is also made in advance that the processing for generating image data of an $N^{th}$ line can be started in the resizing processing section 20e when processing of the data of the $M^{th}$ line is ended.

The timing generator 300 specifies that output data of the $K^{th}$ line is outputted from the area image sensor 15 based on a horizontal synchronization signal SHsync having a prescribed cycle outputted by the timing generator 300. In a case in which determination is made that the output data of the $K^{th}$ line is outputted from the area image sensor 15, the timing generator 300 outputs the trigger signal to the pixel interpolation section 20a to start data processing of the $L^{th}$ line. In a case in which a progress information acquisition section 300a specifies that processing of the data of the $L^{th}$ line is ended in the color reproduction processing section 20b, the timing generator 300 outputs the trigger signal to the filter processing section 20c to start data processing of the $M^{th}$ line. In a case in which the progress information acquisition section 300a specifies that processing of the data of the $M^{th}$ line is ended in the gamma correction section 20d, the timing generator 300 outputs the trigger signal to the resizing processing section 20e to start processing for generating the image data of the $N^{th}$ line.

When determination is made that processing for generating the image data of the $N^{th}$ line by the resizing processing section 20e is ended, the timing generator 300 outputs the horizontal synchronization signal DHsync for displaying the $N^{th}$ line, in the same manner as in the embodiment described above. In other words, in the image data generation section 20, in an image processing step in which it is possible to start generating data of a line which is subsequent to recording of the data of two or more lines in a line buffer, a determination is made as to whether processing for generating data of the lowest necessary number of lines is ended, and the next image processing step is started at the time that the generation processing is ended. Through this configuration, processing for each line does not start before preparation of the necessary data for executing each step is finished, and processing for each line can be immediately started when the data of each line are prepared. As a result, the wait time during execution of each image processing step is minimized. In the present embodiment, since the data of only the lowest necessary number of lines is temporarily recorded in the line buffers 52a through 52d, the capacity of the line buffers 52a through 52d can be minimized.

Furthermore, the display section 40 is an EVF which uses a liquid crystal panel in the embodiment described above, but the display section 40 may be a display section other than an EVF. For example, the display section 40 may be a display section which uses a liquid crystal panel attached to a back surface of the image-capturing device 1, or a display section other than a liquid crystal panel may be used. The image-capturing device 1 may also be a single-lens reflex camera provided with a mirror, the image-capturing device 1 may be a movie camera, or the image-capturing device 1 may be a mobile telephone or other device provided with image-capturing functionality. The color filters are also in a Bayer array in the area image sensor 15 described above, but the present invention may also be applied in an image-capturing device which utilizes a sensor configured in an arrangement other than a Bayer array. The line buffer 52d may be a line buffer, but may also be a VRAM provided with a recording capacity for recording the image data of a single frame. Through this configuration, various types of processing can be performed based on the image data to be displayed. The horizontal synchronization period is also preferably lengthened with respect to a reference period, and various types of periods can be assumed as the reference period. For example, the cycle of the horizontal synchronization signal SHsync of the area image sensor 15, the cycle for generating the image data, and other cycles may be used as the reference period. Furthermore, various forms may be adopted as the form in which various types of signals are transmitted from the timing generator 30 to the display section 40, and signals may be transmitted by HDMI (high-definition multimedia interface) and other methods. The directions in the embodiment described above may also be reversed. In the horizontal direction, for example, display may be performed from left to right or from right to left.

Furthermore, the OSD data are preferably image data indicating predetermined information to be displayed in the information display region of the display section, and a configuration may be adopted in which the predetermined information to be displayed includes various types of information other than that of image-capturing conditions, e.g., information indicating the remaining amount of power in a battery mounted in the image-capturing device 1, or other information. Various configurations other than the configuration described above may also be employed as the configuration for making the cycles of the vertical synchronization signals SVsync, DVsync the same and constant. For example, a configuration may be adopted in which, after display in the subject image display region R1 is performed, the smallest period that can be set for displaying the OSD data in the information display region R2 is used as the horizontal synchronization period in the information display region R2, whereby display of all the lines of the liquid crystal panel 42 is completed before the output timing of the vertical synchronization signal DVsync, and the vertical synchronization signal DVsync is outputted at a prescribed output timing after waiting for the remainder of the period.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image-displaying device comprising: an image data generation section including a circuit configured to generate a predetermined unit of image data based on output data captured by an image-capturing section, the output data corresponding to a part of an image of a subject; and a display section configured to display each line of an image of a subject for display based on the predetermined unit of image data for a horizontal synchronization period prescribed by a horizontal synchronization signal, the horizontal synchronization period being variable, wherein a vertical synchronization period to display a single frame is constant by lengthening or shortening the horizontal synchronization period with respect to a reference period determined in advance.

2. The image-displaying device according to claim 1, further comprising:
   a timing generator configured to output timing information indicative of timing,
   wherein the display section is further configured to display the image of the subject after the display section had received the timing information.

3. An image data generation device to be used with an image-capturing device and a display device comprising: an image data generation section including a circuit configured to generate a predetermined unit of image data based on output data captured by the image-capturing device, the output data corresponding to a part of an image of a subject; and a timing generator configured to output timing information to the display device, the timing information indicating a horizontal synchronization period prescribed by a horizontal synchronization signal to display each line of an image of a subject for display based on the predetermined unit of image data on the display, wherein the horizontal synchronization period is variable, and a vertical synchronization period to display a single frame is constant by lengthening or shortening the horizontal synchronization period with respect to a reference period determined in advance.

4. The image-displaying device according to claim 1, wherein
   the horizontal synchronization period is variable in processing from image capturing by the image-capturing section to display by the display section.

5. The image data generation device according to claim 3, wherein
   the horizontal synchronization period is variable in processing from image capturing by the image-capturing device to display by the display device.

6. An image-displaying device comprising: an image data generation section including a circuit configured to generate a predetermined unit of image data based on output data captured by an image-capturing section, the output data corresponding to a part of an image of a subject; and a display section configured to display each line of an image of a subject for display based on the predetermined unit of image data for a horizontal synchronization period prescribed by a horizontal synchronization signal, the horizontal synchronization period being variable, wherein the display section is further configured to display each line of an image of a subject simultaneously with ending generation of image data of the line by the image data generation section, and a vertical synchronization period to display a single frame is constant by lengthening or shortening the horizontal synchronization period with respect to a reference period determined in advance.

* * * * *